(12) United States Patent
Svensson

(10) Patent No.: US 7,871,263 B2
(45) Date of Patent: Jan. 18, 2011

(54) SYSTEM FOR CONTROLLING AIR/FUEL RATIO IN A GAS FLOW CONTAINING GASEOUS FUEL

(75) Inventor: Lars Svensson, Limhamn (SE)

(73) Assignee: Odena Engineering, Limhamm (SE)

( * ) Notice: Subject to any disclaimer, the term of this patent is extended or adjusted under 35 U.S.C. 154(b) by 1029 days.

(21) Appl. No.: 11/387,610

(22) Filed: Mar. 23, 2006

(65) Prior Publication Data

US 2006/0223014 A1   Oct. 5, 2006

(30) Foreign Application Priority Data

Apr. 4, 2005   (SE) .................................... 0500720

(51) Int. Cl.
*F23D 11/44*   (2006.01)
(52) U.S. Cl. .............................. 431/11; 431/89; 431/90; 431/12
(58) Field of Classification Search .................... 431/89, 431/90, 36, 42, 12, 11
See application file for complete search history.

(56) References Cited

U.S. PATENT DOCUMENTS

| | | | |
|---|---|---|---|
| 3,590,791 A * | 7/1971 | Roosa | 123/79 R |
| 4,153,021 A | 5/1979 | Hattori et al. | |
| 4,217,869 A * | 8/1980 | Masaki | 123/704 |
| 4,616,621 A | 10/1986 | Kuroiwa et al. | |
| 4,659,306 A | 4/1987 | Altemark et al. | |
| 6,055,844 A * | 5/2000 | Kondo et al. | 73/23.32 |

FOREIGN PATENT DOCUMENTS

GB   1 568 426   5/1980

\* cited by examiner

*Primary Examiner*—Alfred Basichas
(74) *Attorney, Agent, or Firm*—Merchant & Gould P.C.

(57) ABSTRACT

A system for controlling air/fuel ratio in an air/fuel mixture supplied to a premix burner for gaseous fuels includes a blower (310) for inducting and pressurising combustion air, a Venturi-pipe (330) for governing a rate of gas to be mixed into the combustion air, and a pressure regulator (230) interconnecting a source of gaseous fuel to a supply point in the Venturi pipe (330). A preheated reaction chamber (500) and a lambda sond (620) are connected to a controller (350) controlling an amount of air bypassing said Venturi-pipe (330).

8 Claims, 2 Drawing Sheets

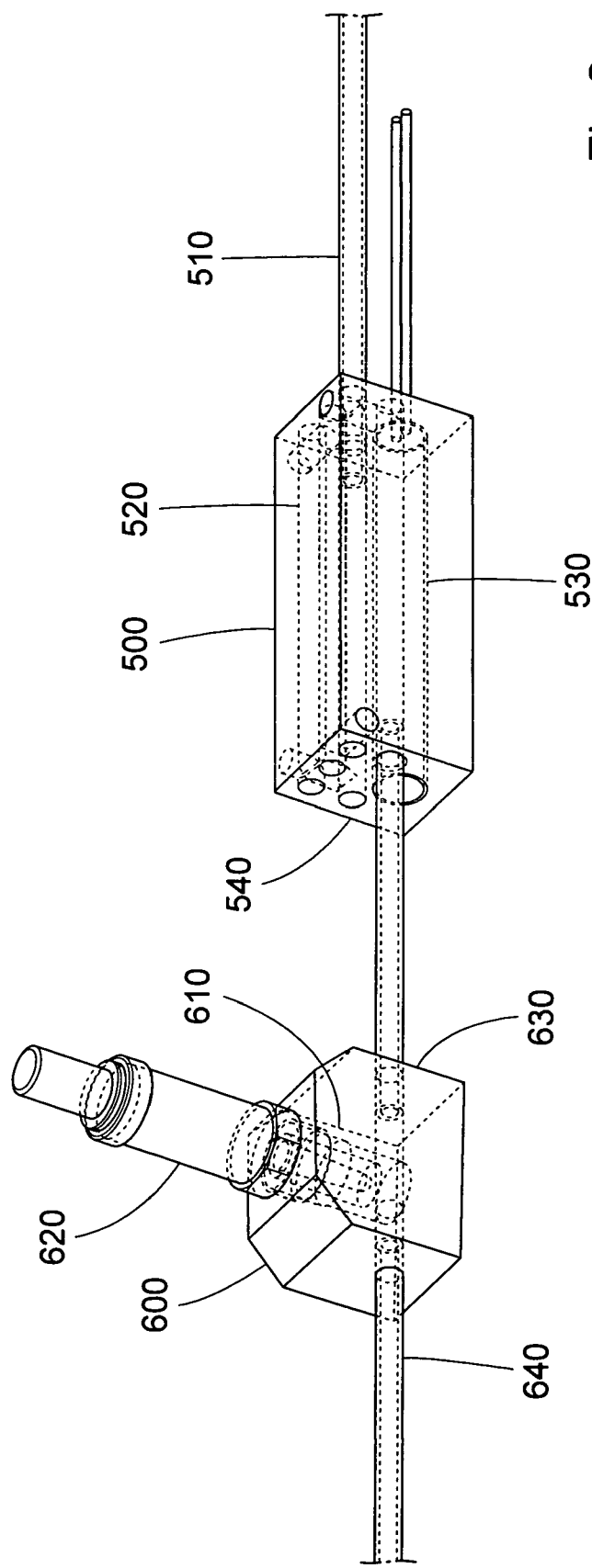

SYSTEM FOR CONTROLLING AIR/FUEL RATIO IN A GAS FLOW CONTAINING GASEOUS FUEL

FIELD OF THE INVENTION

The present invention relates to a system for controlling air-fuel ratio in a gas provided to a burner for gaseous fuels, said system including a blower for inducting and pressurising combustion air, a Venturi-pipe for controlling an amount of fuel gas mixed into the combustion air, and a balanced pressure regulator being connected to a source of gaseous fuel and to a point down-stream the Venturi pipe.

PRIOR ART

Regarding premixed combustion, i.e. a combustion where a fuel and an oxidizer are mixed prior to the actual combustion, it is essential to maintain a proper mixture between the amount of oxygen and the amount of fuel.

An old, well known, way to achieve a proper air/fuel ratio for a premixed combustion is to use a carburettor. The function of a carburettor is well known by persons skilled in the art of combustion, but will nevertheless be explained briefly below.

A carburettor relies on a physical law stating that the sum of static and dynamic pressure is constant (this law is known as Bernoulli's law); this law is valid in a number of applications, e.g. for aeroplanes (the air on the topside of the wing is forced to travel over a longer distance than the air on the underside—hence, the air velocity will be larger on the topside of the wing and hence the dynamic pressure—according to the above stated law—will be higher and the static pressure will be lower; the decreased static pressure enables the aeroplane to take off). In a carburettor, air is forced to pass a pipe with an area decrease; in the same manner as for the aeroplane wing, the air will be forced to pass the area decrease with a higher velocity; this will increase the dynamic pressure and, according to Bernoulli's law, decrease the static pressure. In a carburettor for e.g. combustion engines, this decrease in static pressure will suck in e.g. gasoline from small holes arranged where the area is at its smallest. The more air that passes the carburettor, the lower the static pressure will be; hence, more gasoline will be sucked in, and a relatively stable air/fuel ratio, regardless of air flow, will be achieved.

The same working principles can also be used for gaseous fuels instead of gasoline. One severe drawback with carburettors and other mechanisms relying on Bernoulli's law is that it is very difficult to fine-tune the air/fuel ratio; the involved pressure differences are small, and areas are always difficult to vary, especially small areas.

On automobiles, increased control of air/fuel ratios has been achieved by replacing the carburettors with electronically controlled injection systems. By using fuel injectors and a "lambda sond" in the exhaust pipe from the engine, it is possible to obtain a very precise control of the air/fuel ratio to the engine (maintaining a precise control of the air/fuel ratio to an engine is crucial to be able to use a catalyst).

All combustion systems are however not as "easy" to control. For example, flame treatment devices with premixed gas burners are used to prepare packaging paper webs for lamination of plastic film; since the combustion gases from such devices is vented away to the atmosphere immediately after leaving the burner, it is impossible to use a lambda sond to control the air/fuel ratio. Moreover, injectors for gaseous fuels have proven to be unreliable, since it is harder to prevent leakage of gas than leakage of gasoline.

There are already several solutions for mixing gaseous fuels and air for consecutive combustion in a "premix-burner". Most of these solutions work with a mechanism relying on Bernoulli's law, and are hence very difficult or impossible to control. Moreover, long-time changes of the air/fuel ratio are virtually impossible to detect; hence, a device according to the prior art may run flawlessly for an extended period of time, but suddenly, as the air/fuel ratio has drifted outside the acceptable air/fuel ratio deviation, it will not work anymore. In the case with flame treatment of packaging paper webs, the production line must be shut down and a technician must be called in to fix the problem. As can be understood, all such production line shut-downs are costly, and it would be worth a lot to be able to constantly monitor and control the air/fuel ratio. Furthermore, the quality of the gas supply may vary significantly; for e.g. natural gas, the content of combustible gas may vary from about 80% up to 100%. Obviously, a system according to what has been described above is not able to correct for such variations.

Hence, the problem to be solved by the present invention is how to control and monitor air/fuel ratio for a gas burner venting the combustion gases to the atmosphere.

SUMMARY OF THE INVENTION

The above problems are solved by an air/fuel control system comprising a preheated reaction chamber and a lambda sond connected to a controller controlling an amount of air bypassing a Venturi-pipe.

For a number of reasons, it is advantageous if the lambda sond is arranged in a probe chamber connected to the preheated reaction chamber.

In order to decrease the necessary temperature for the reaction chamber, the internal surfaces of reaction channels in the reaction chamber could be provided with a catalytic coating.

Due to the high pressure ratio, it is advantageous if a blower supplying the system with combustion air is a side channel blower.

In order to cool combustion gas emerging from the reaction chamber, the preheated reaction chamber and the probe chamber could be interconnected by an uninsulated piping.

If the system must be installed in a restricted space, the uninsulated piping joining the preheated reaction chamber and the probe chamber could be wound in a spiral fashion.

BRIEF DESCRIPTION OF THE DRAWINGS

In the following, the invention will be described with reference to some preferred embodiments and the appended drawings, wherein;

FIG. 2 is a schematic perspective view of a system for controlling air/fuel ratio according to the present invention.

DESCRIPTION OF A PREFERRED EMBODIMENT

Figure 1:
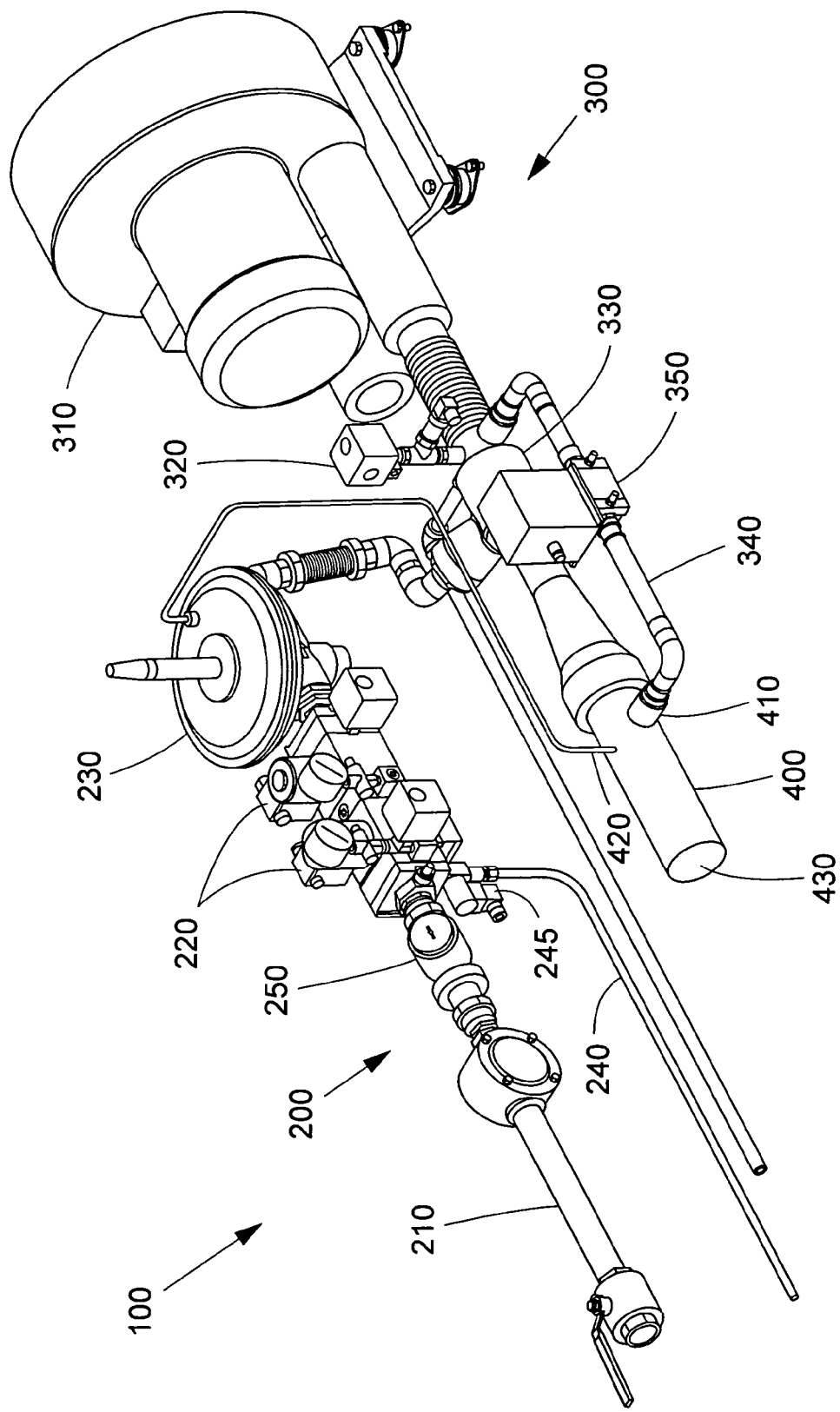
FIG. 1 is a schematic perspective view of a bypassed Venturi-pipe according to the present invention.

As implied in the "prior art" section, the present invention can e.g. be used to control air/fuel ratio in a burner used to preheat and enhance a surface of e.g. a paper web in a packaging paper machine. The invention can however be used to control air/fuel ratios also for other applications, such as biogas furnaces.

In FIG. 1, a system 100 for mixing air and a gaseous fuel is show. Basically, the system 100 comprises a portion 200 for supply of gas, a portion 300 for supply of air and a mixing zone 400 for delivering air/fuel mixture to a burner (not shown). The portion 200 for supply of gaseous fuel comprises a supply line 210, at least one pressure reducing valve 220 and one balanced pressure regulator 230. The portion 200 also comprises a gas outlet 240, controlled by a valve 245, for connection to a pilot flame (not shown) igniting the burner (not shown), and a gas flow meter 250. The portion 300 for supply of air comprises a blower 310 (in this case a side channel blower), a pressure gauge 320 to measure the pressure of the air supplied from the blower 310, a Venturi pipe 330 and a Venturi bypass 340, provided with a controller 350.

The mixing zone 400 comprises at least four branches; a first branch 410 for allowing bypassed air entering the mixing zone, a second branch 420 for supplying the balanced pressure regulator with a pressure of the mixing zone gases, a third branch (not shown) for supplying air/fuel mixture to a reaction chamber 500 (to be described later) and a fourth branch 430 leading air/fuel mixture to the burner (not shown). The mixing zone 400 is supplied with an air/fuel mixture from the Venturi pipe 330 and from the Venturi bypass 340. Preferably, the fourth branch 430 should include at least two 90 degree bends (not shown) in order to increase mixing of the air/fuel mixture.

In FIG. 2, a reaction chamber 500 and a probe chamber 600 are shown. The reaction chamber 500 comprises an inlet 510 for letting in an air/fuel mixture, a reaction channel system 520 (shown in dashed lines), an electrical preheater 530 and an outlet 540. Preferably, the reaction chamber is manufactured from a solid block of metal, e.g. stainless steel.

The probe chamber 600 comprises a space 610 for receiving a broad-band lambda sond 620. The space 610 is connected to a gas inlet 630 (which in turn is connected to the outlet 540 of the reaction chamber 500) and to an exhaust gas outlet 640. Hereinafter, the function of the above described components will be described. Gaseous fuel (hereinafter referred to as gas) is supplied from a gas source (not shown) through the supply line 210. Depending on the gas pressure in the gas source, one or two pressure reducing valves 220 are used to decrease the gas pressure, before the low-pressure gas is led to the balanced-pressure regulator 230. A small amount of gas is branched out from the main flow of gas through the gas outlet 240 in order to feed a pilot flame igniting the burner (not shown). The function of the balanced pressure regulator 230 is to maintain an equal pressure of the gas and the pressure in the mixing portion 400 (as mentioned, the second branch from the mixing zone is used to inform the balanced pressure regulator about the pressure in the mixing portion). Gas with a pressure equalling the pressure in the mixing zone 400 is led from the balanced pressure regulator 230 to the Venturi pipe 330; here, gas is mixed into an air stream, wherein the rate of the gas mixed into the air flow is controlled by the rate of air flowing through the Venturi pipe, in a way that will be described later.

Simultaneously, air is compressed in the blower 310 and led towards the Venturi pipe 330. As mentioned, the Venturi pipe 330 comprises an area decrease, wherein the air velocity will increase. The gas from the balanced pressure regulator will hence (according to Bernoullis law) be sucked into the air stream. The pressure gauge 320 is placed upstream the Venturi pipe, i.e. between the blower 310 and the Venturi pipe 330. The pressure measured by the pressure gauge 320 is used to monitor and control the output of mixed gas from the system 100 according to the present invention, since the air flow (and hence the gas flow) is proportional to the air pressure upstream the Venturi pipe 330. Another option to monitor the output is to use output signals from the gas flow meter 250.

The third branch (not shown) of the mixing portion 400 is connected to the inlet 510 of the reaction chamber 500. The air/gas mixture from the mixing zone will enter the reaction channels 520, and, due to the heat caused by the electric preheater 530, react to form combustion gases, namely $CO_2$ and $H_2O$. The electric preheater heats the reaction chamber to a temperature of up to 900° C. After the reaction in the reaction chamber 500, the combustion gases flow to the probe chamber 600, in which a broadband lambda sond 620 is placed. An amateurish, but working, rule of thumb states that a lambda sond measures the concentration of oxygen in a gas mixture; in a combustion gas resulting from a complete combustion (which is guaranteed due to the high temperature in the reaction chamber 500), the concentration of oxygen is directly proportional to air/fuel ratio of the air/fuel mixture (a high air/fuel ratio leads to a high concentration of oxygen, a low air/fuel ratio leads to a low oxygen concentration).

Note that the combustion gas emerging from the reaction chamber has a high temperature. Depending on the specification of the lambda sond 620, it might be necessary to cool the emerging combustion gas. This could e.g. be achieved by using an uninsulated piping between the reaction chamber 500 and the probe chamber 600.

The lambda sond measurement is used as an input to the controller 350, which controls the amount of air that is bypassing the Venturi pipe 300; if the controller 350 increases the amount of bypassed air, the air/fuel ratio in the mixing portion will increase, since the bypassed air will not be mixed with gas, and vice versa. As implied above, a pilot flame is used to ignite the burner burning the premixed air/gas mixture emerging from the system 100 according to the present invention. The reason for using a pilot flame for the ignition is mainly that the fuel supply to the pilot flame can be shut off after burner ignition; this means that a spark plug used to ignite the pilot flame will not be heated by neither the pilot flame nor the flame from the burner, which would be the case if the spark plug was arranged to ignite the burner itself. The use of pilot flames to ignite burners of the type used in conjunction with the system according to the present invention is however well known, and does not form a part of the present invention.

According to the above described system, it is possible to control the air/fuel ratio of a system 100 for mixing air and a gaseous fuel. It is also possible to provide the described system with an alert system alerting the user if the controller 350 is working close to an extreme (i.e. controlling the amount of bypassed air to a full value or to zero). In such a case of an alert, the basic setting of the system must be adjusted, e.g. by changing efficient flow diameters of either the air supply system 300 or the gas supply system 200, or by setting pressure ratios of gas and air, respectively.

If the control system according to the present invention would malfunction, it is also possible to run the system without feedback, i.e. as a prior art system.

Above, only one preferred embodiment of the invention has been described. There are however several modification possible within the invention. For example, the reaction chamber could be equipped with a catalyst; as is well known by persons skilled in the art, a catalytic material speeds up a chemical reaction without being consumed itself. In the present invention, a catalyst could be used to enable a lower temperature to be used in the reaction chamber 500. As catalyst, both metal matrix catalysts and ceramic matrix catalysts could be used.

A similar way to enable a lower temperature of the reaction chamber 500 is to coat the internal walls of the reaction channels 520 with a catalytic material.

In order to improve the cooling of the combustion gas emerging from the reaction chamber, it might be necessary to use a long, air-cooled piping between the reaction chamber 500 and the probe chamber 600. If the available space is restricted, the piping could be wound in a spiral fashion.

DIMENSIONS

A system 100 according to the present invention is preferably used to supply air/gas mixtures with a heating power ranging from about 5 kW to 600 kW.

The diameter of the area decrease in the Venturi pipe is preferably ranges from about 7 mm to about 38 mm, which corresponds to the above heating power ranges. The air flow is preferably in the range from 5 m3/minute to 540 m3/minute, and the air pressure upstream the Venturi area decrease is preferably ranging from 1.05 bar (abs) to 1.25 bar (abs). The cross sectional area of the Venturi bypass 340 preferably ranges from about 10 mm to about 40 mm.

The effective length of the piping joining the reaction chamber 500 and the probe chamber 600 ranges preferably from 0.1 to 1 metre, and the dimension of the reaction chamber is preferably 5×5×15 cm. The heating power of the electrical preheater 530 is preferably about 400 W.

Some preferred gaseous fuels that can be used in a system according to the present invention are natural gas, biogas, methane, ethane, propane, butane, carbon monoxide, or mixtures thereof.

As in to be understood, the above system is controlled by means of some type of controller, e.g. a PID controller or a PI controller.

Above, some preferred embodiments have been used to describe the present invention. Those preferred embodiments are however not intended to limit the scope of the invention, which is solely defined by the appended claim set.

The invention claimed is:

1. A combination premix burner and control system comprising:
   a premix burner having combustion gases that are vented away to atmosphere immediately after combustion;
   a blower for inducting and pressurizing combustion air,
   a feed system for fuel,
   a Venturi-pipe connected to the blower and the feed system, wherein a flow of air through the Venturi-pipe controls a flow of fuel through the feed system,
   a preheated reaction chamber connected to a lambdasond, and
   a bypass duct for combustion air connected to an upstream side and a downstream side of the Venturi-pipe, wherein a flow of air through the bypass duct is controlled responsive to a signal from the lambdasond, and wherein the bypass duct is constructed to provide air flowing through the bypass duct that does not include fuel and that does not pass through the Venturi-pipe.

2. The system according to claim 1, wherein the lambdasond is arranged in a probe chamber connected to the preheated reaction chamber.

3. The system according to claim 2, wherein an uninsulated piping interconnects the preheated reaction chamber and the probe chamber in order to cool combustion gas emanating from the reaction chamber.

4. The system according to claim 3, wherein the uninsulated piping is spirally wounded.

5. The system according to claim 1, wherein the preheated reaction chamber comprises a catalyst.

6. The system according to claim 5, wherein internal surfaces of the preheated reaction chamber are provided with a catalytic coating.

7. The system according to claim 1, wherein the blower is a side channel blower.

8. A method for controlling an air/gas mixture delivered to a premix burner comprising:
   (a) providing a primary compressed air flow stream and a bypass compressed air flow stream;
   (b) mixing the primary compressed air flow stream with a gas fuel to create a first air/gas mixture;
   (c) mixing the bypass compressed air flow stream with the first air/gas mixture to create a second air/gas mixture;
   (d) combusting a first portion of the second air/gas mixture in a preheated reaction chamber to form a combustion gas;
   (e) measuring the oxygen content of the combustion gas with a lambdasond connected to the preheated reaction chamber;
   (f) controlling the amount of bypass compressed air mixed with the first air/gas mixture based on a sensed value for the measured oxygen content of the combustion gas from the lambdasond; and
   (g) delivering a second portion of the second air/gas mixture to a premix burner having combustion gases that are vented immediately away to atmosphere immediately after combustion.

\* \* \* \* \*